US012776729B2

(12) United States Patent
Spolveri et al.

(10) Patent No.: US 12,776,729 B2
(45) Date of Patent: Oct. 27, 2026

(54) MULTIPLE VARIABLE SPEED DRIVE UNIT ON A COMPRESSION SHAFT LINE

(71) Applicant: Nuovo Pignone Tecnologie—S.r.l., Florence (IT)

(72) Inventors: Niccolò Spolveri, Florence (IT); Daniele Sgrò, Florence (IT); Michele Frattoni, Florence (IT); Valentina Nardi, Florence (IT)

(73) Assignee: Nuovo Pignone Tecnologie S.R.L., Florence (IT)

( * ) Notice: Subject to any disclaimer, the term of this patent is extended or adjusted under 35 U.S.C. 154(b) by 309 days.

(21) Appl. No.: 18/682,718

(22) PCT Filed: Aug. 16, 2022

(86) PCT No.: PCT/EP2022/025379

§ 371 (c)(1),
(2) Date: Feb. 9, 2024

(87) PCT Pub. No.: WO2023/020716

PCT Pub. Date: Feb. 23, 2023

(65) Prior Publication Data

US 2024/0364242 A1 Oct. 31, 2024

(30) Foreign Application Priority Data

Aug. 18, 2021 (IT) .......................... 10202100002231

(51) Int. Cl.
*H02P 7/00* (2016.01)
*H02P 5/52* (2016.01)

(52) U.S. Cl.
CPC ...................................... *H02P 5/52* (2013.01)

(58) Field of Classification Search
CPC .... H02P 5/52; H02P 6/10; H02P 27/04; H02P 5/74; H02P 6/04; H02P 29/50; H02P 25/098
See application file for complete search history.

(56) References Cited

U.S. PATENT DOCUMENTS 5,528,094 A 6/1996 Hasebe et al.
7,034,427 B2 4/2006 Hirzel
(Continued)

FOREIGN PATENT DOCUMENTS

CN 109791005 A * 5/2019 .............. H02P 29/50
EP 3 846 335 A1 7/2021
(Continued)

OTHER PUBLICATIONS

Kumar Vinay et al: "An Industrial Survey on Electric Drives and Scope of Multilevel Inverter Based Induction Motor Drives in Sugar Industry", Sugar Tech, Springer India, New Delhi, vol. 23, No. 4, Jan. 29, 2021 (Jan. 29, 2021), pp. 709-719, XP037484021, ISSN: 0972-1525, DOI: 10.1007/S12355-020-00940-W [retrieved on Jan. 29, 2021] the whole document.
(Continued)

*Primary Examiner* — Karen Masih
(74) *Attorney, Agent, or Firm* — Paul Frank + Collins P.C.

(57) ABSTRACT

A drive unit for driving a load, like a centrifugal compressor, a pump, or the like, comprising a driving shaft connected to the load to be driven. The drive unit comprises a plurality of electric motors connected to the driving shaft and a plurality of variable frequency drives electrically connected to the power grid used to feed each electric motor.

16 Claims, 5 Drawing Sheets

(56) References Cited

U.S. PATENT DOCUMENTS

| | | | |
|---|---|---|---|
| 8,727,736 | B2 | 5/2014 | Walth |
| 9,906,172 | B2 | 2/2018 | Ross |
| 9,973,117 | B2 | 5/2018 | Pieder et al. |
| 11,088,651 | B2 | 8/2021 | Sun et al. |
| 2015/0244293 | A1 | 8/2015 | Pieder et al. |
| 2021/0080172 | A1 | 3/2021 | Baracco et al. |
| 2021/0123441 | A1 | 4/2021 | Coupart et al. |

FOREIGN PATENT DOCUMENTS

| | | | | |
|---|---|---|---|---|
| EP | 3920176 | A1 | 8/2021 | |
| EP | 3 930 176 | A1 | 12/2021 | |
| JP | 2000249052 | A | 9/2000 | |
| JP | 2015533470 | A | 11/2015 | |
| WO | 2011157567 | A1 | 12/2011 | |
| WO | 2014122774 | A1 | 8/2014 | |
| WO | WO-2018031071 | A1 * | 2/2018 | ................ H02P 5/74 |
| WO | 2018206102 | A1 | 11/2018 | |
| WO | 2020/196310 | A1 | 10/2020 | |

OTHER PUBLICATIONS

Liang Xiaodong et al: “Frequency Response Analysis for Phase-Shifting Transformers in Oil Field Facilities”, IEEE Transactions On Industry Applications, IEEE Service Center, Piscataway, NJ, US, vol. 50, No. 4, Jul. 1, 2014 (Jul. 1, 2014), pp. 2861-2870, XP011553365, ISSN: 0093-9994, DOI: 10.1109/TIA.2013.2291936 [retrieved on Jul. 15, 2014] the whole document 11,12.

* cited by examiner

Delta-Wye

MULTIPLE VARIABLE SPEED DRIVE UNIT ON A COMPRESSION SHAFT LINE

TECHNICAL FIELD

The present disclosure concerns a multiple variable speed drive unit operating on a compression driving shaft or shaft line, to drive a load, such as a compressor, a pump, or the like.

BACKGROUND ART

In several technical fields, such as the oil and gas one, it is usually required to drive loads, such as compressors or pumps. Also, nowadays the application of the so-called "full electric" compression shaft line solutions are steadily increasing, because they do not release in the environment any exhaust gases deriving from the combustion of chemical fuel, such as gas or diesel.

However, for the applications mentioned, usually, the electric motor has to generate a notable amount of power. Therefore, the electric motor is then equipped with a Variable Frequency Drive (VFD) (or Variable Speed Drive System—VSDS) to control the power supply of the electric motors and therefore the torque generated thereby. More specifically, a Variable Frequency Drive (VFD) is a power electronic device for feeding an electric motor capable of controlling the speed and the torque of the driven equipment such as, as mentioned above, pumps, compressors, fans, etc.

Referring for instance to the oil and gas field, and in particular, to the Lique-faction Natural Gas (LNG) applications, a compression shaft line requires Variable Frequency Drives with high rated power in the range of 50 MW-100 MW, and in general, LNG systems driven solely by VFDs are also referred to as "e-LNG". In such a power range, referenced VFDs are very few. Therefore, two or even more electric motors fed by a respective Variable Frequency Drive of a smaller power are operatively connected to the shaft line, to drive the load with the required high power.

However, while supplying the required power to the relevant electric motor, a VFD generates also disturbing alternating torque components, which can excite natural frequencies of the shaft line that can cause excessive shaft vibrations with possible mechanical failures.

Also, the VFD of each electric motor is connected to the power grid and even in this case, disturbing current harmonics injected into the grid by the VFD can cause distortions and heating problems on the network.

An improved multiple variable speed drive unit equipped with two or more electric motors acting on the same shaft line capable of driving remarkable loads and preventing, at the same time, the generation of torsional vibrations into the shaft line as well as avoiding the generation of electric harmonics into the grid would be welcomed in the technology.

SUMMARY

In one aspect, the subject matter disclosed herein is directed to a drive unit for driving a load, such as a centrifugal compressor, a pump, or the like. The drive unit comprises a driving shaft coupled with the load, for the latter to be driven. Also the drive unit is equipped with a plurality of electric motors, each of which is mechanically coupled with each other in series to the driving shaft. Also, a plurality of variable frequency drives is foreseen. Each variable frequency drive is connected to or coupled with an electric motor, to adjust the relevant torque and the angular speed. The variable frequency drives usually cause, while operating, by their operation, the generation of torque harmonics other than the mean torque value, and current harmonic components on a power grid other than a fundamental current component, which cause misfunction of the entire system. The drive unit comprises also a plurality of isolation transformers, each one connected to, or coupled with a variable frequency drive and to the power grid. The electric motors and the isolation transformers are configured to reduce the torque harmonics other than the mean torque value and the current harmonics components other than the fundamental current component. Such torque harmonics are oscillating torque harmonics.

In another aspect, disclosed herein is that each electric motor comprises a stator, which, in its turn, has a plurality of windings. The windings of each stator of an electric motor are shifted of predetermined angles with each other, so as to reduce the overall alternating torque components acting on the driving shaft.

In another aspect, disclosed herein is that each electric motors are a three-phase type and the stator has three windings.

In another aspect, disclosed herein is that each electric motor comprises a rotor, which is mechanically coupled with the driving shaft and has a predetermined physical angular displacement with respect to the rotors of the other electric motors.

In another aspect, the subject matter disclosed herein concerns that each isolation transformer comprises a primary winding, connected to a common point of the power grid, and a secondary winding, connected to the relevant variable frequency drive. The primary winding of each isolation transformer is connected to the power grid at the same point of common coupling. The primary windings or the secondary windings of the isolation transformers are arranged with different vector groups to reduce the current harmonics injected into the power grid.

In another aspect, disclosed herein is that the driving unit is equipped with a control logic unit connected to at least one of the variable frequency drives. The control logic unit is configured to control the power generated by the electric motors and transferred to the load. The control logic unit provides the angular speed reference value to the first variable frequency drive, and the first variable frequency drive is capable of providing the torque reference value to the plurality of variable frequency drives, to maintain the required angular speed of the driving shaft.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

In the field of oil and gas, it is generally required to drive the load, such as centrifugal compressors or pumps, which require high driving power. Nowadays electric motors are preferred devices for driving the load since no pollution is spread in the environment. To reach the required power to drive the above-mentioned loads, several electric motors are required, coupled with each other in series, to sum up the power they generate.

The electric motors are fed by Variable Frequency Drives, which introduce disturbing alternating torques components into the shaft line and/or disturbing current harmonics injected into the grid. According to the present disclosure, it is possible to arrange the electric motors between them and/or arrange voltage isolation transformers, to reduce the disturbing alternating components in such a way that they cancel each other. This has several benefits, including but not limited to, that of reducing, minimizing, and/or even eliminating undesired torsional vibrations on the driveshaft, thus reducing or avoiding mechanical problems to the operation of the drive unit. This also can have the benefit of extending the operational life of the driveshaft and/or of other components, such as couplings.

As used herein, a “voltage isolation transformer” is an electrical machine capable of transferring electrical power from a source of alternating current (AC) power to some equipment or device, while isolating the powered device from the power source for safety reasons. An isolation transformer changes the amplitude of the AC voltage and blocks transmission of the DC component in signals from one circuit to the other, allowing AC components to pass.

Isolation transformers can be electrically connected in several different schemes, depending on how the primary and secondary windings of the transformers are electrically connected. As better specified below, among the available connections there are the so-called “Delta-Wye connection” and “Delta-Delta connection”, which allow different voltage ratios and phase shifting between the primary winding and the secondary winding of the isolation transformers.

Figure 1:
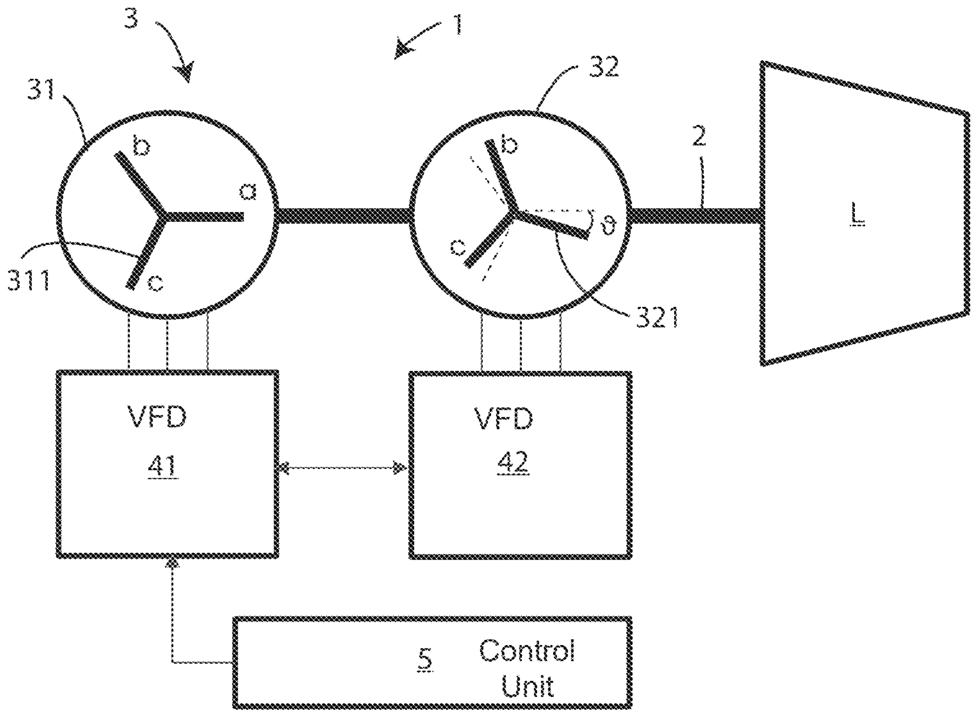
FIG. 1 illustrates a schematic view of a drive unit for driving a centrifugal compressor, according to a first embodiment.

Referring now to the drawings, FIG. 1 shows a first embodiment of a drive unit 1 for driving a load L. The drive unit 1 comprises a driving shaft 2, mechanically coupled with the load L to be driven, an electric power unit 3, comprising two electric motors 31, 32, each one mechanically coupled with the driving shaft 2 to drive the load L, and two variable frequency drives (VFDs) 41, 42, electrically connected to a respective electric motor 31 and 32, to supply each one of them to adjust the torque to be generated by the electric motors 31 and 32. The drive unit 1 also comprises a control logic unit 5, which, in the embodiment shown in FIG. 1 is operatively connected to the first VFD 41.

According to the present disclosure, the load L is a centrifugal compressor. A centrifugal compressor is a rotating machine that achieves a pressure rise by adding kinetic energy/velocity to a fluid through an impeller. However, in other embodiments, the type and the number of the loads L may be different. More specifically, to remain in the oil and gas field, the load L can be, for instance, a pump for pumping oil through the pipeline.

According to the present disclosure, as can be appreciated referring to FIG. 1, the electric motors 31 and 32 are series-connected. Also, as mentioned above, each electric motor 31 and 32 operate on the driving shaft 2. In particular, the rotor of each electric motor 31 and 32 is mechanically coupled with the driving shaft 2. In some embodiments, the type and number of the electric motors 31 and 32 may be different. In particular, in some embodiments more than two electric motors, such as three or four electric motors, can be included, acting on the same driving shaft 2, which is series-connected.

In the present embodiment, each electric motor 31 and 32 is a three-phase type, which is quite diffused in the application. However, different types of electric motors can be considered.

Each one of the VFDs 41 and 42 supplies the respective electric motor 31 and 32, in order to adjust the torque T applied from the electric motor 31 and 32 to the driving shaft 2. More specifically, given the power absorbed by the load L and the angular speed ω of the driving shaft 2, a certain torque is requested by the load L and therefore each of the electric motors 31 and 32 have to generate a specific torque. The VFDs 41 and 42 then control the power supply of the relevant electric motor 31 and 32 for them to generate the right torque in order to drive the load L according to the required rotating speed a.

In the first embodiment of the drive unit 1 illustrated in FIG. 1, the control logic unit 5 controls the first VFD 41 connected to the first electric motor 31. In particular, the control logic unit 5 can control the first electric motor 31 in speed regulation mode, through the first VFD 41. The second electric motor 32 is controlled in torque regulation mode through the second VFD 42. Thence, the control logic unit 5 is configured to operate the first VFD 41 to set the angular speed ω of the first electric motor 31, and therefore of the driving shaft 2, while the second variable frequency drive VFD 42 is capable of adjusting the toque T of the second electric motor 32, as better specified below.

The control logic unit 5 can be embodied as a programmable microcontroller, a PLC, and the like. The control logic unit 5 can be manually programmed using any suitable programming technique and/or programming language, such as C++ and the like, to contain computer-readable instructions, that when executed by a computer processor, cause the computer processor to read the operating status of each VFD 41 and 42, for instance, as well as each electric motor 31 and 32, namely the power absorbed, the torque generated, the angular speed of the drive shaft 2.

The control unit 5 is then programmed to generate, in one embodiment, a first output signal to control the VFD 41 and a second output signal to control the VFD 42, to adjust the angular speed of each electric motor 31 or 32, to balance torque reference value T they generate. In this way, as better explained below, a cancellation of the torque harmonics (excluding the mean torque value) and the current harmonic components (excluding the fundamental current component) is allowed through the arrangement of the couplings of the electric motors 31, 32, and of isolation transformers, as better explained below.

Usually, the control logic unit 5 is embodied with a motherboard electrically connected to the VFD of the electric motor to control. The control logic unit 5 can be possibly placed even remotely with respect to the VFD equipment it is connected to.

The control logic unit 5, as mentioned, is operatively connected to the first VFD 41. In particular, the control logic unit 5 is capable of determining an angular speed reference value, or angular speed setpoint a, and transmitting the angular speed reference value ω to the first VFD 41. The two VFDs 41 and 42 exchange torque and speed data in order to maintain the angular speed reference value ω required by the control logic unit 5, properly distributing the torque T to be generated by both the electric motors 31 and 32, according the load L torque demand.

As also shown in FIG. 1, the two VFDs 41 and 42 are connected with each other to interoperate. Specifically, the two VFDs 41 and 42 are, as mentioned above, electronic devices capable of controlling the power supply of the respective electric motor connected thereto, so as to control its speed and the torque by adjusting the frequency and voltage of the motors power supply.

Also, and in general, the angular speed ω of the driving shaft 2 is determined by the load L, such as the compressor, where, depending on the operating regimes, a different angular speed ω is required. Therefore, based on the power required by the load L, the total torque required is set as well, and the control logic unit 5 adjusts indirectly the operation of the first electric motor 31 and therefore of the second electric motor 32 to possibly proportionally distribute the torque to be generated to drive the load L. If the torque generated by the first 31 and the second 32 electric motor is the same, the alternating torque components have the same amplitude, and, if properly shifted, they can be mutually canceled, as better specified below.

Continuing referring to FIG. 1, each electric motor 31 and 32, which is mechanically coupled with the driving shaft 2, has a relevant stator windings, respectively 311 and 321.

When each electric motor 31 and 32 is supplied by the relevant VFD 41 and 42, disturbing torque harmonics, namely the harmonics different from the mean torque value, can be introduced, and they can generate torsional vibrations on the driveshaft 2 possibly causing mechanical problems to the operation of the drive unit 1. As mentioned, above, when the torque generated by the first 31 and second electric motor is the same, the amplitude of the alternating torque components generated by each electric motor 31 and 32 has same amplitude.

The stators 311 and 321 of the first 31 and the second 32 electric motor, as mentioned above, have the windings designed to be phase-shifted of an angle above-called θ. In particular, the stator windings 311*a*, 311*b*, and 311*c*, of the first electric motor 31 are physically shifted with respect to the relevant stator windings 321*a*, 321*b* and 321*c*, of the second electric motor 32 of the above-mentioned predetermined displacement angle θ. More specifically, the stator windings 321*a*, 321*b* and 321*c* of the second 32 electric motor are radially (namely perpendicular to the driving shaft 2 length to which the electric motor 2 is coupled with) physically shifted by the above-mentioned displacement angle θ, with respect to the stator windings 311*a*, 311*b*, and 311*c* of the first electric motor 31.

Since the first electric motor 31 is three-phase, it comprises three-phase windings 311*a*, 311*b*, and 311*c*, which are arranged to have a predetermined physical angular displacement θ with respect to the three-phase windings 321*a*, 321*b*, and 321*c* of the second electric motor 32. According to the present disclosure, the angular displacement θ is 30°, as in the case of six-phase windings electric motors. However, in some embodiments, different physical angular displacement θ can be used based on the specific application and motor construction technology.

In case the drive unit 1 comprises more than two motors, then there will be an angular displacement between each of subsequent electric motors series coupled with the driving shaft 2, properly calculated in order for reducing the alternating torque components.

Still referring to FIG. 1, where, according to the present disclosure, each electric motor 31 and 32 mechanically coupled to the driving shaft 2 is a three-phase winding motor, with the predefined angular displacement θ between the two sets of three-phase windings 311*a*, 311*b* and 311*c* and 321*a*, 321*b* and 321*c* of the stators of the two relevant electric motors 31 and 32, some torque harmonics, different from the mean torque value, are reduced from the equivalent resultant airgap torque acting on the two motor rotors coupled together. In other words, and more specifically, each electric motor 31 and 32 have torque harmonics components. However, being the stator windings of each motor 31 and 32 shifted of the above-mentioned displacement angle θ, and being such electric motors 31 and 32 mechanically coupled with the same driving shaft 2, the resultant torque generated by the same electric motors 31 and 32, which is the sum of the relevant torques, reduces the undesired torque harmonics.

As mentioned above, torques harmonics are generated by the use of VFDs 41 and 42. In particular, such harmonics are superimposed on the average torque T as oscillating torque, which can be an excitation for torsional resonance modes of, for instance, a train for an LNG application, leading the shaft line, namely the driving shaft 2, into possible vibration issues.

Considering that the electric motors 31 and 32 driven by the two VFDs 41 and 42 are coupled with the same driving shaft 2, the same two VFDs 41 and 42 will operate preferably at the same power level (i.e., the same torque distribution, which, as mentioned above, is the optimized solution for better distributing the power to be de-livered by the electric motors 31 and 32) and with the electric motor stators 311 and 321 configurations shown in FIG. 1, the undesired torque harmonics (namely, as said above, the harmonics different from the mean torque value) reduction is maximized. In fact, such torque harmonics of each VFD 41 and 42, when the mean torque generated by each electric motor is the same, given the rotating speed ω, then the amplitudes of the same torque harmonics have also the same value.

Specifically, in some embodiments, the arrangement of the two sets of three-phase windings 311*a*, 311*b* and 311*c*, and 321*a*, 321*b*, and 321*c* of the stators 311 and 321 of the two relevant electric motors 31 and 32 allows canceling the alternating torque components. Said alternating torque components, as mentioned above, are generated by the VFDs 41 and 42. More specifically, the phase shift of the windings of the stator 321 of the second electric motor 32 is designed for the phasors of the undesired harmonics to be 180° phase-shifted with respect to the phasor the same undesired harmonics generated by the VFD 41 of the first electric motor 32, so that they can cancel out each other.

In addition, through the operation of the control logic unit 5, an optimization of the drive unit 1 operation is achieved since having two motors they can generate the same torque so that the cancellation of alternate torques is maximized. The same thing applies to the cancellation of current harmonics components injected into the power grid through the phase shift of the isolation transformer windings, as better specified below, where current harmonic components are those other than a fundamental current component set a 50 Hz or 60 Hz, depending on the grid G and the electric network.

Figure 2:
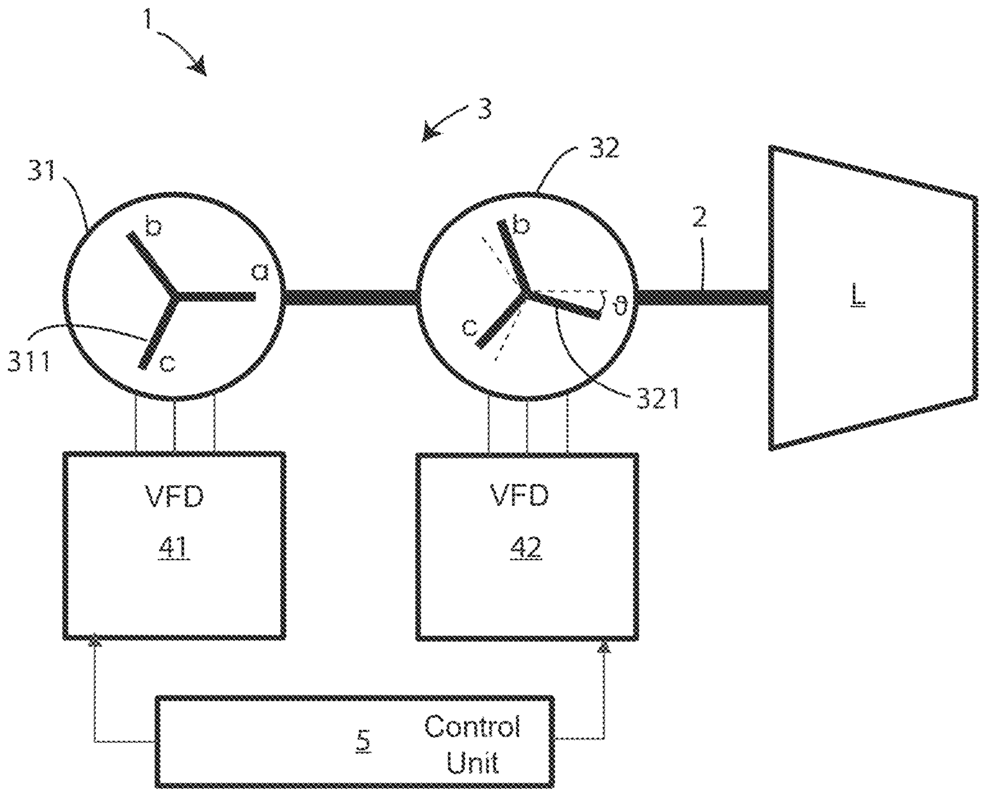
FIG. 2 illustrates a schematic view of a drive unit, according to a second embodiment.

Referring to FIG. 2, a second embodiment of the drive unit 1 is shown. In particular, the control logic unit 5 is now connected to both the first 41 and the second 42 VFDs, each one of which, also, in this case, is connected respectively to the first 31 and the second 32 electric motor.

Also in this embodiment, the first 31 and the second 32 electric motors are mechanically coupled with the driving shaft 2, which is mechanically coupled with the load L.

In this second embodiment, the torque T or the power and the angular speed ω control is directly performed by the control logic unit 5, which is coupled, as mentioned above, with both the VFDs 41 and 42.

In this embodiment, the VFDs 41 and 42 are not directly in communication with each other. In particular, the control logic unit 5 is configured to determine the angular speed reference value ω and a torque reference value or torque setpoint T, to maintain the angular speed on the driving shaft 2, distributing the torque T to be generated between both the electric motors 31 and 32.

Furthermore, the control logic unit 5 is configured and programmed, as mentioned above, to transmit the angular speed reference value ω to the first VFD 41 and the torque reference value T to the second VFD 42 so as to control the two VFDs 41 and 42 in speed and/or torque respectively. In this way, being the angular speed ω desired on the driving shaft 2 set, the control logic unit 5 allows controlling of the two electric motors 31 and 32, by means of the first 41 and the second 42 VFDs, distributing the overall torque T required to generate the required power to be transmitted to the load L.

The operation of the drive unit 1 of the second embodiment of FIG. 2 is the same as that of the first embodiment. In this case, however, the control logic unit 5 is directly connected to the second VFD 42, therefore a more specific control of the operation of the second electric motor 32 can be carried out directly by the control logic unit 5.

The drive unit 1 of the second embodiment illustrated in FIG. 2 is also capable of canceling the alternating torque components generated by the VFDs 41 and 42, through the arrangement of the two sets of three-phase windings 311*a*, 311*b*, and 311*c*, and 321*a*, 321*b* and 321*c* of the stators two relevant electric motors 31 and 32, which also, in this case, are phase-shifted of a displacement angle θ to cancel the undesired alternating torque components of the first VFD 41 with those of the second VFD 42, shifting the phase the latter of 180°.

Therefore, in both the first embodiment as shown in FIG. 1 as well as the second embodiment in FIG. 2, the drive unit 1 is able to suppress or cancel one or more alternating torque components, two reduce possible mechanical resonances on the driving shaft 2.

In some embodiment, the control logic unit 5 is also configured to control the power generated by the electric motors 31, 32 and transferred to the load L. The control logic unit 5 is then configured to provide a torque reference value T to the first variable frequency drive 41, and a torque reference value T to the variable frequency drive 42, to maintain the required angular speed of the driving shaft 2.

Figure 3:
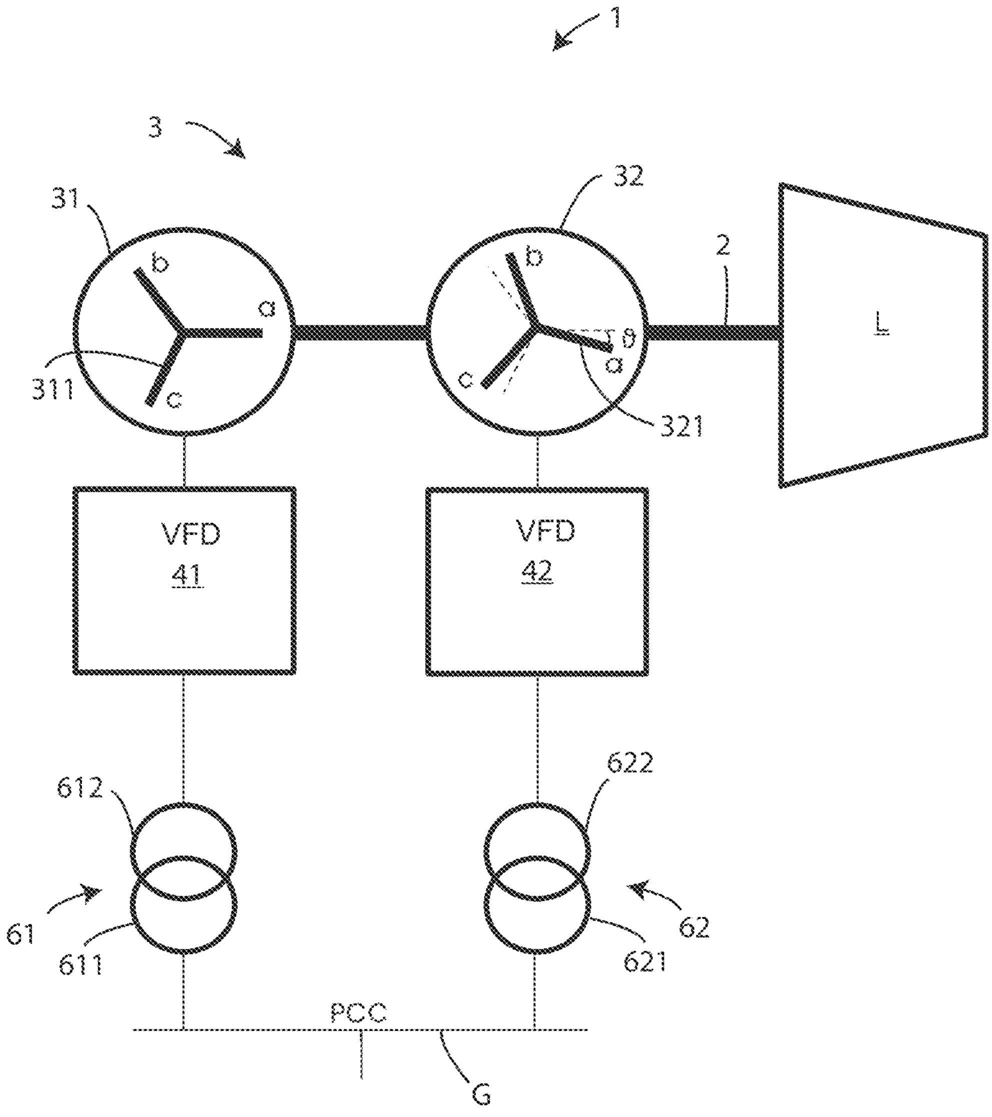
FIG. 3 illustrates a schematic view of a drive system, according to a third embodiment.
Figure 4:
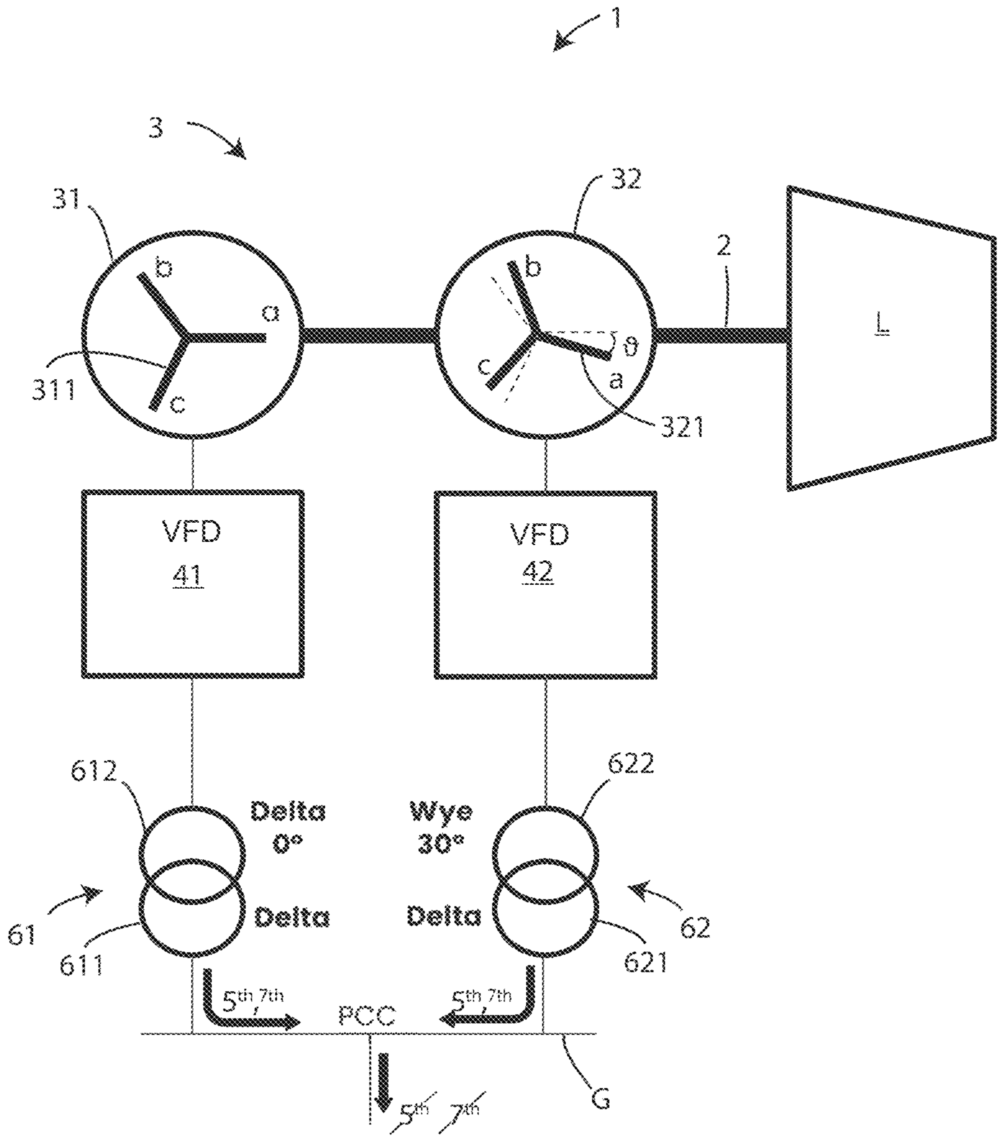
FIG. 4 illustrates a schematic view of operation of the drive system of FIG. 4.

Referring to FIGS. 3 and 4, a third embodiment of a drive unit 1 is shown, which also, in this case, comprises two electric motors 31 and 32, mechanically coupled with the driving shaft 2, in its turn mechanically coupled with the load L. As in the previous embodiments, the electric motors 31 and 32 are driven and supplied by a relevant VFD, still respectively indicated by the reference numbers 41 and 42.

The drive unit 1 also comprises two isolation transformers, one for each VFD 41 and 42, in particular, a first 61 and a second 62 isolation transformer. Specifically. The first isolation transformer 61 is connected between the first VFD 41 and the power grid G, and the second isolation transformer 62 is connected between the second VFD 42 and the power grid G. Also, each isolation transformer 61 and 62 comprises primary windings, respectively indicated with the reference numbers 611 and 621, and secondary windings, respectively indicated with the reference numbers 612 and 622.

The two isolation transformers 61 and 62 are capable of transferring electrical power from the power grid G to the VFDs 41 and 42 while isolating the same VFDs 41 and 42 from the power grid G.

The primary windings 611 and 621 of the first 61 and second 62 isolation transformers of each VFD 41 and 42 are connected to the grid G at the same point of common coupling, as shown in FIG. 3 and FIG. 4. The secondary windings 612 and 622 of the first 61 and the second 62 isolation transformers of each VFDs 41 and 42 are arranged so as to suppress the current harmonic components generated by the drive unit 1 into the grid G. The operation principle is that of taking the current harmonics generated from each variable speed system 41 and/or 42 and shift one source of the harmonics by 180° with respect to the other, to combine them together, thus resulting in the cancellation of these current harmonics injected into the grid G.

For example, in a three-phase power distribution system, the 5th and 7th harmonics are the predominant ones and usually cause distortion and heating problems. The cancellation of these current harmonic components generated by each VFDs 41 and 42 can be achieved (but not limited to this configuration) by arranging the vector groups of the isolation transformers 61 and 62 in a first configuration or "Delta-Delta" configuration and a second configuration or Delta-Wye configuration respectively, as better shown in FIG. 5 and FIG. 6, where a representation of "Delta-Delta" and Delta-Wye transformer primary and secondary windings vector groups arrangements are shown. More specifically, in the Delta-Delta connection configuration the primary windings as well as the secondary windings of a three-phase transformer are electrically connected as a delta (namely "A"). Instead, the Delta-Wye connection configuration, the primary windings, still of a three-phase transformer, are connected as a delta, while the secondary windings are electrically connected as a "Y".

In particular, the Delta-Delta configuration of the first isolation transformer 61, causes a 0° phase shift of the current, while the Delta-Wye configuration of the second isolation transformer 62 causes 300 current phase shifting of the current that feeds the second VFD 42.

The 5th harmonic in the Delta-Wye transformer 62 is phase shifted by 5 times 300 and so it has a 1500 phase shift. In addition, the 5th harmonic is a negative sequence harmonics, so it is in the opposite direction of the fundamental that is 300 phase shift in the opposite direction, resulting in a total 1800 phase shift. In this way, the 5th harmonic generated by the two VSDs systems will have a phase shift of 1800 with respect to each other, causing the cancellation of this harmonic component.

Similarly, the 7th harmonic in the Delta-Wye second transformer 62 is phase shifted by 7 times 300 and so it has a 2100 phase shift. The 7th harmonic is a positive sequence harmonic, so the relative sifting with the fundamental is again 180°.

The cancellation of the above-mentioned harmonics can be visualized in FIG. 4, where it can be appreciated that the fifth and the seventh current alternating harmonic components coming from the primary winding 611 and 621 of the first 61 and the second 62 isolation transformers cancel in view to the connection to the grid G.

In this way, the drive unit 1 according to the third embodiment illustrated in FIG. 3 and FIG. 4 is capable of canceling both the alternating torque components by the angular displacement θ between the two sets of three-phase windings 311*a*, 311*b* and 311*c* and 321*a*, 321*b* and 321*c* of the stators two relevant electric motors 31 and 32 as well as the disturbing current harmonic components other than the fundamental current component of the grid G, through the isolation transformers 61 and 62.

Other connections of the primary winding 611 and 621 and of the secondary windings 612 and 622 of the first 61 and the second 62 isolation transformers can be foreseen for canceling the undesired current harmonics.

As mentioned above, the electric motors 31 and 32, driven by the two VFDs 41 and 42, are connected to the same driving shaft 2, the two VFDs 41 and 42 will operate preferably at the same power level, thus maximizing the harmonic cancellation effects at the point of common coupling, since the harmonic components will have the same amplitude. In principle, the same effect of harmonic cancellation could be achieved by two independent VFDs 41 and 42 connected to the same point of common coupling, but sizing and operating conditions of independent VFDs 41 and 42 are typically driven by process requirements of the driven machine (e.g., centrifugal compressors), and it is unlikely that these VFDs 41 and 42 can operate continuously at the same level of power maximizing the harmonic cancellation.

Figure 7:
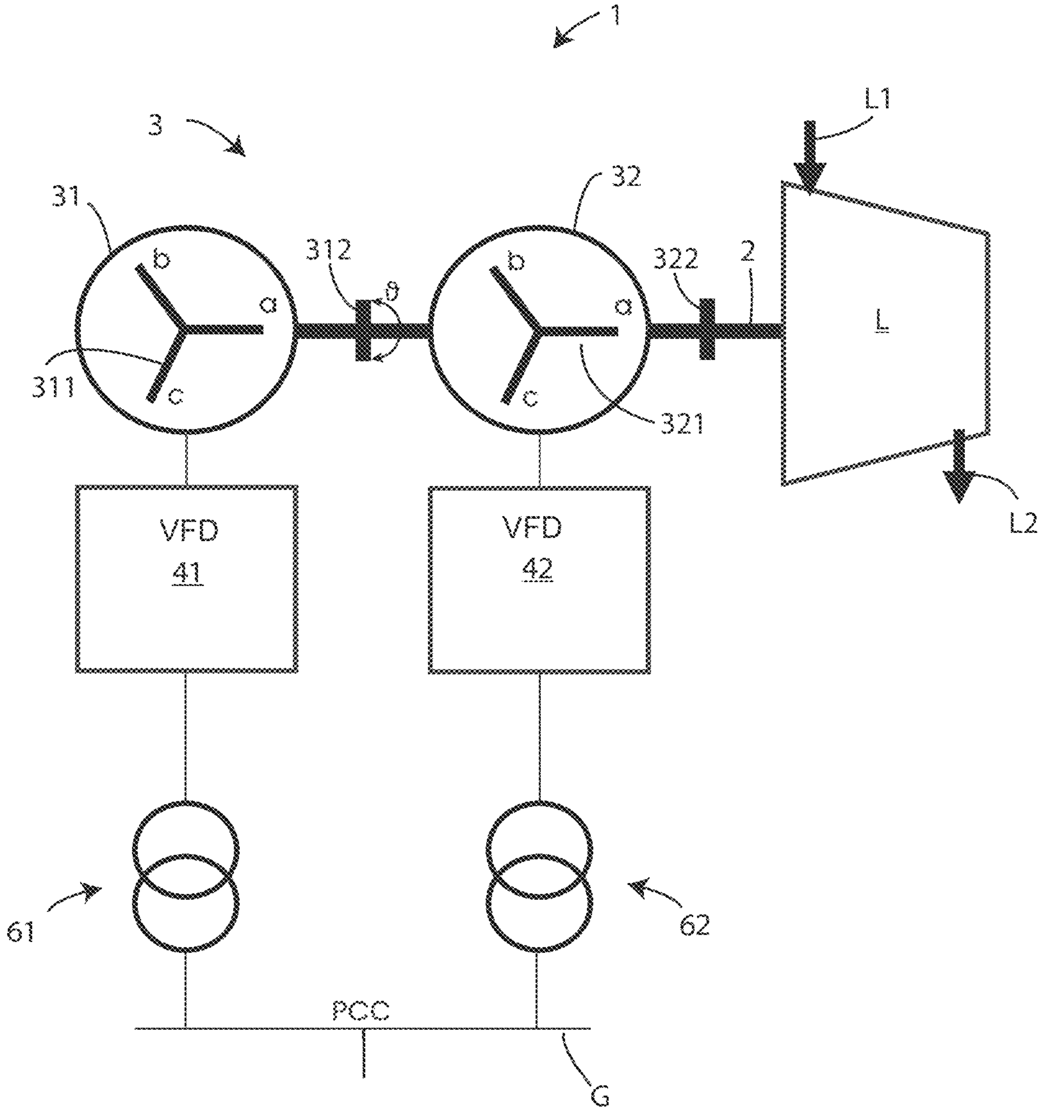
FIG. 7 illustrates a schematic view of a drive unit, according to a fourth embodiment.

Referring to FIG. 7, a fourth embodiment of the drive unit 1 is illustrated, in which the arrangement of the three-phase stator windings 311*a*, 311*b* and 311*c*, of the first electric motor 31 is the same as the relevant stator windings 321*a*, 321*b* and 321*c* of the second electric motor 32. However, the rotor 312 of the first electric motor 31 has a predetermined physical angular displacement θ with respect to the rotor 322 of the second electric motor 32.

Therefore, the effect of the torque harmonics reduction (namely the harmonics different from the mean torque value) is achieved in this embodiment maintaining the same arrangement of the electric motor stator windings, as it is schematically shown in FIG. 7, but physically shifting of a predefined displacement angle θ the rotor 312 of the first electric motor 31 with respect to the rotor 322 of the second electric motor 32.

The operation of the fourth embodiment of the drive unit 1 is the same as the third embodiment of FIG. 3 or FIG. 4. Also, in this case, the drive unit 1 comprises a first isolation transformer 61 connected between the VFD 41 and the grid G, and a second isolation transformer 62 connected between the VFD 42 and the grid G. In this way, the drive unit 1 is theoretically capable of canceling the disturbing current harmonics, when the electrical power absorbed by the electric motors is the same.

Figure 5:
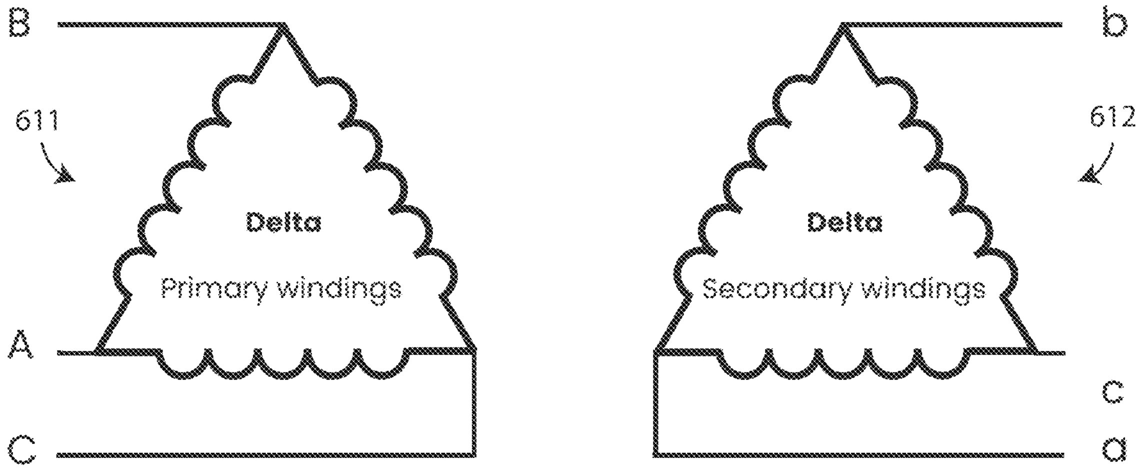
FIG. 5 illustrates a Delta-Delta connection of the windings of an isolation transformer.
Figure 6:
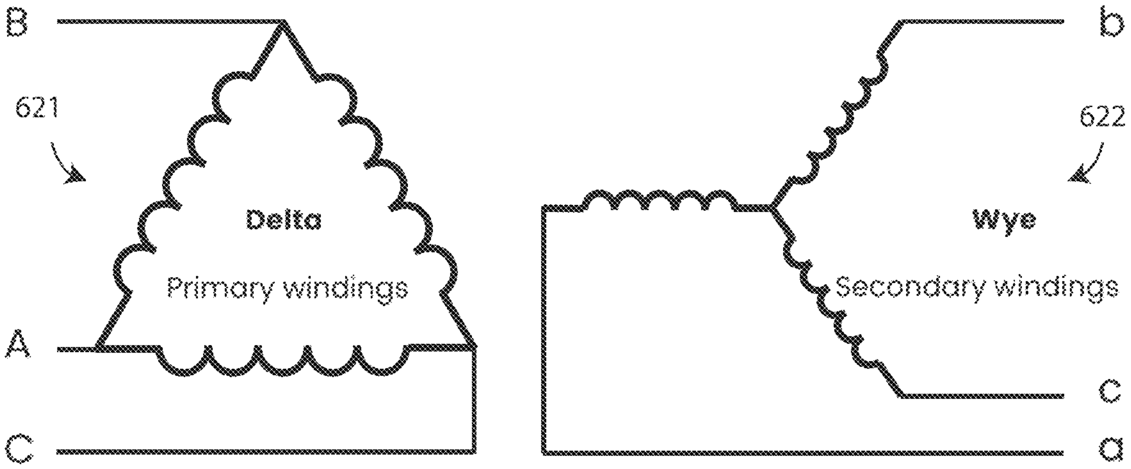
FIG. 6 illustrates a Delta-Wye connection of the windings of an isolation transformer.

Referring now to FIGS. 4, 5, and 6, one operating cycle an embodiment of the invention will be described for purposes of illustration. Specifically, in operation, when the electric motors 31 and 32 operate to drive the load 2, they are supplied by the relevant VFDs 41 and 42. The shift of the motors stator windings 311 and 321 by the displacement angle θ, allow the cancellation of the undesired torque harmonics, namely those harmonics different from the mean torque value. In this way, the electric motors 31 and 32 transmit to the load L the mean torque value, without, or reducing, undesired mechanical torque oscillations on the shaft.

At the same time, The VFDs 41 and 42 are supplied respectively by the transformers 61 and 62. Since the three-phase transformer 61 primary and secondary windings are connected in Delta-Delta connection, with phase-shift of the VFD 41 (the one supplying the first electric motor 31) current supply equal to 0°, while the three-phase transformer 62 primary and secondary windings are connected in Delta-Wye connection, with phase-shift of the other VFD 42 (the one supplying the second electric motor 32) current supply equal to 30° in the embodiment shown, the fifth and the seventh current harmonics cancel each other at the grid G.

While aspects of the invention have been described in terms of various specific embodiments, it will be apparent to those of ordinary skill in the art that many modifications, changes, and omissions are possible without departing from the spirit and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A drive unit for driving a load, the drive unit comprising:

a driving shaft;

a first electric motor and a second electric motor mechanically coupled to the first electric motor in series to the driving shaft; and a first variable frequency drive and a second variable frequency drive coupled to the first electric motor and the second electric motor, respectively;

a first isolation transformer and a second isolation transformer each coupled with the first variable frequency drive and the second variable frequency drive, respectively, and to the power grid; and a control logic unit, wherein the control logic unit generates a speed reference value and a torque reference value, and wherein the first variable frequency drive and the second variable frequency drive operate the first electric motor and the second electric motor in a speed regulation mode and a torque regulation mode, respectively, in response to the speed reference value and the torque reference value to maintain the shaft at a target angular speed.

2. The drive unit of claim 1, wherein one or more torque harmonics of the second electric motor are phase-shifted with respect to the respective torque harmonics of the first electric motor to reduce the overall torque harmonics acting on the driving shaft.

3. The drive unit of claim 1, wherein each the first electric motor and the second electric motor comprise a stator, wherein the stator has a plurality of stator windings, and, wherein the stator windings are radially physically shifted by a predetermined displacement angle of ±9° with respect to the stator windings of a reference electric motor to reduce the overall torque harmonics acting on the driving shaft.

4. The drive unit of claim 1, wherein the windings of the second electric motor are shifted a predetermined displacement angle with respect to the stator windings of the first electric motor to reduce the overall torque harmonics acting on the driving shaft.

5. The driving unit of claim 1, wherein the first electric motor is a three-phase type and the stator has three windings.

6. The driving unit of claim 3, wherein the predetermined displacement angle of the stator relative to the stator of a reference electric motor is set to suppress or reduce one or more torque harmonics to reduce possible mechanical excitations on the driving shaft.

7. The drive unit of claim 1, wherein the first electric motor and the second electric motor comprise a rotor mechanically connected to the driving shaft and that has a predetermined physical angular displacement with respect to the rotor of the other electric motors.

8. The drive unit of claim 1, wherein the first electric motor and the second electric motor comprise a rotor mechanically connected to the driving shaft, and, wherein the rotor of the second electric motor has a predetermined physical angular displacement with respect to the rotor of the first electric motor.

9. The drive unit of claim 8, wherein the predetermined displacement angle is set to suppress or reduce one or more torque harmonics to reduce possible mechanical excitations on the driving shaft.

10. The driving unit of claim 1, wherein the first isolation transformer and the second isolation transformer comprise a primary winding configured to connected to a common point of a power grid, and, a secondary winding connected to the first variable frequency drive or the second frequency drive, respectively, and, wherein the primary windings or the secondary windings of the plurality of isolation transformers are arranged with different vector groups to reduce the current harmonics components injected into the power grid.

11. The driving unit of claim 1, wherein the first isolation transformer comprises a primary winding configured to connect to a common point of a power grid and a secondary winding connected to the first variable frequency drive, wherein the primary winding and the secondary winding of the first isolation transformer are connected in a "Delta-Delta" configuration, and, wherein the second isolation transformer comprises a primary winding configured to connect to a common point of the power grid and a secondary winding connected to the second variable frequency drive, wherein the primary winding and the secondary winding of the second isolation transformer are connected in a "Delta-Wye" configuration.

12. The driving unit of claim 1, wherein the first electric motor and the second electric motor generate equal torque.

13. The driving unit of claim 1, wherein the first variable frequency drive is capable of providing the torque reference value to the plurality of variable frequency drives to maintain the required angular speed of the driving shaft.

14. The driving unit of claim 1, wherein the control logic unit is connected to the first variable frequency drive and the second variable frequency drive.

15. The driving unit of claim 13, wherein the control logic unit is configured to control the power generated by the plurality of electric motors and transferred to the load; and wherein the control logic unit is configured to provide torque reference value to the first variable frequency drive, and wherein the control logic unit is configured to provide torque reference value to the plurality of variable frequency drives, to maintain the required angular speed of the driving shaft.

16. The driving unit of claim 1, wherein the second electric motor is a three-phase type and the stator has three windings.

* * * * *